(12) United States Patent
Steuer et al.

(10) Patent No.: US 8,886,795 B2
(45) Date of Patent: Nov. 11, 2014

(54) METHOD AND SYSTEM FOR DETERMINING RESPONSE TIME OF A SERVER

(75) Inventors: Rotem Steuer, Modin (IL); Eyal Kenigsberg, Dolev (IL); Michael Gopshtein, Yahud (IL); Nick Ioffe, Bat Yam (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 477 days.

(21) Appl. No.: 13/015,300

(22) Filed: Jan. 27, 2011

(65) Prior Publication Data
US 2012/0198047 A1    Aug. 2, 2012

(51) Int. Cl.
*G06F 15/173*      (2006.01)
*H04L 12/26*      (2006.01)

(52) U.S. Cl.
CPC .................. *H04L 43/0852* (2013.01)
USPC ........................................................ 709/224

(58) Field of Classification Search
USPC ........................................................ 709/224
See application file for complete search history.

(56) References Cited

U.S. PATENT DOCUMENTS

| | | | | |
|---|---|---|---|---|
| 6,446,028 | B1* | 9/2002 | Wang | 702/186 |
| 6,522,631 | B2* | 2/2003 | Rosborough et al. | 370/252 |
| 2002/0120727 | A1* | 8/2002 | Curley et al. | 709/223 |
| 2003/0221000 | A1* | 11/2003 | Cherkasova et al. | 709/224 |

* cited by examiner

*Primary Examiner* — Helal A Algahaim
*Assistant Examiner* — Mahmoud Ismail

(57) ABSTRACT

A method for determining a response time of a server may include monitoring communications to and from the server to detect a client request to the server. The method may also include detecting in the monitored communications at least one trigger signal associated with the client request. The method may further include determining a response time of the server to be the time difference between a time at which the at least one trigger signal was fully received and a beginning time of transmission of a final server response from the server, disregarding transmission periods and periods during which the client request is not processed by the server. A computer readable medium and system for determining a response time of a server are also disclosed.

20 Claims, 7 Drawing Sheets

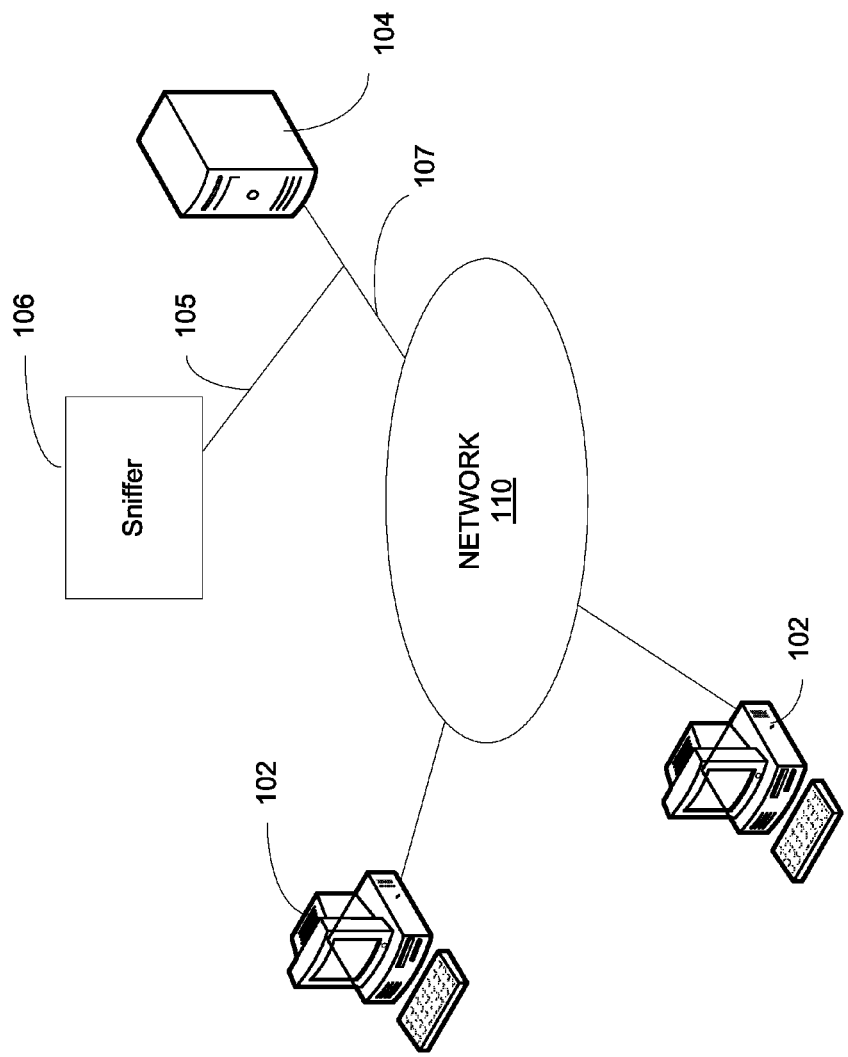

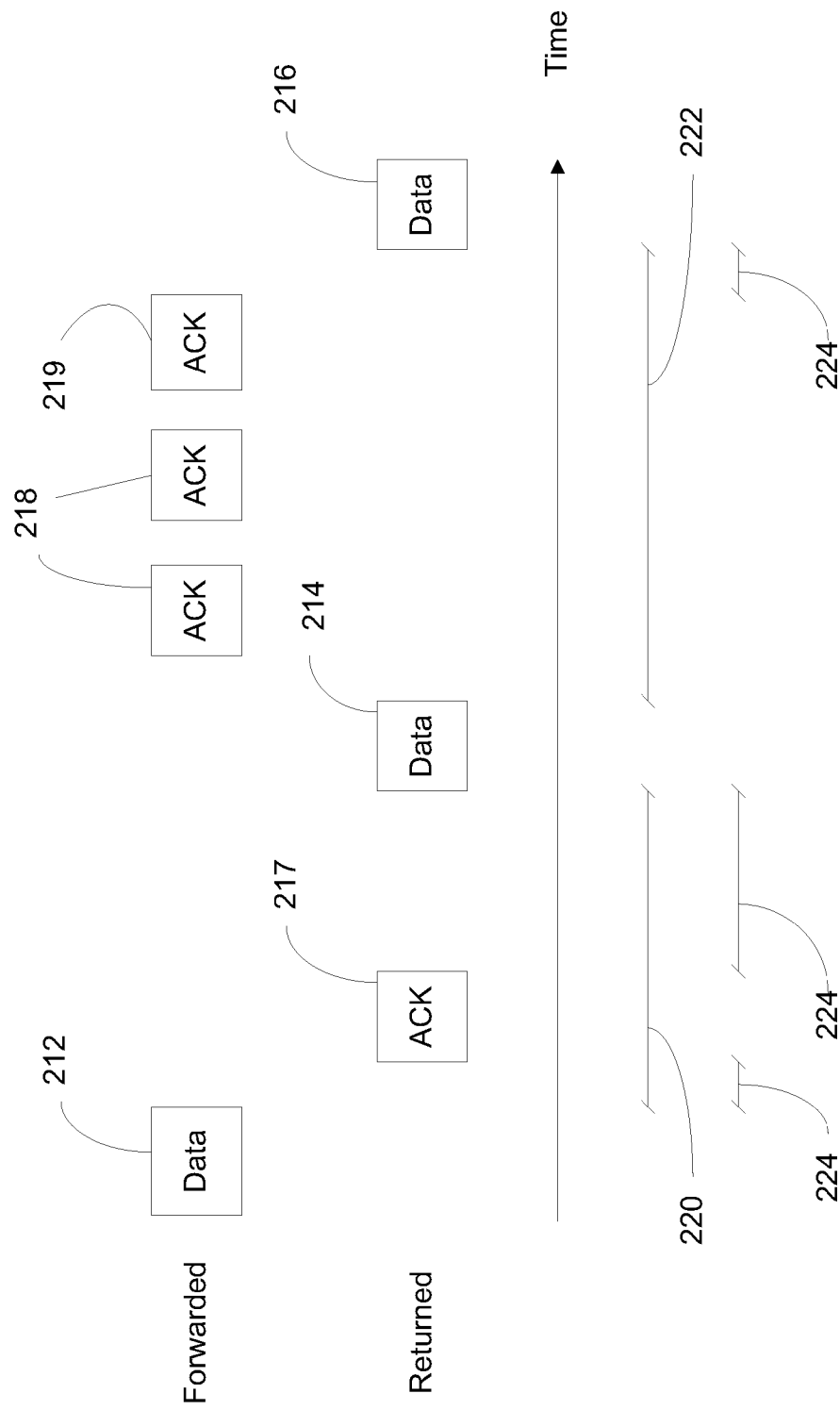

METHOD AND SYSTEM FOR DETERMINING RESPONSE TIME OF A SERVER

BACKGROUND

Many organizations spend a lot of money and time to study the performance of their offered applications running on computerized systems. Determining the quality level of a system performance is important both for long-run planning of better systems and for addressing imminent impediments on the performance as they occur, in order to remove these impediments immediately and prevent further degradation of service.

For example, LoadRunner, commercially available from Hewlett Packard (HP), is an automated performance and load testing product for examining system behavior and performance, which involves generating an actual load on the application under test (AUT). LoadRunner can emulate a multitude of concurrent users to put the AUT through the rigors of real-life user loads, while collecting information from key infrastructure components (Web servers, database servers etc.). The results may then be analyzed in detail, to explore the reasons for particular behavior.

When determining system performance, it is sometimes desired to estimate server response time, distinguishing between calculation time and communication time.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. It should be noted that the figures are given as examples only and in no way limit the scope of the invention. Like components are denoted by like reference numerals.

FIG. 1A illustrates a network system for determining a response time of a server, in accordance with an embodiment of the present invention.

FIG. 2 schematically illustrates communications between a server and a client, and demonstrates determination of the response time of the server to a request from a client, and according to embodiments of the present invention.

DETAILED DESCRIPTION

Figure 1B:
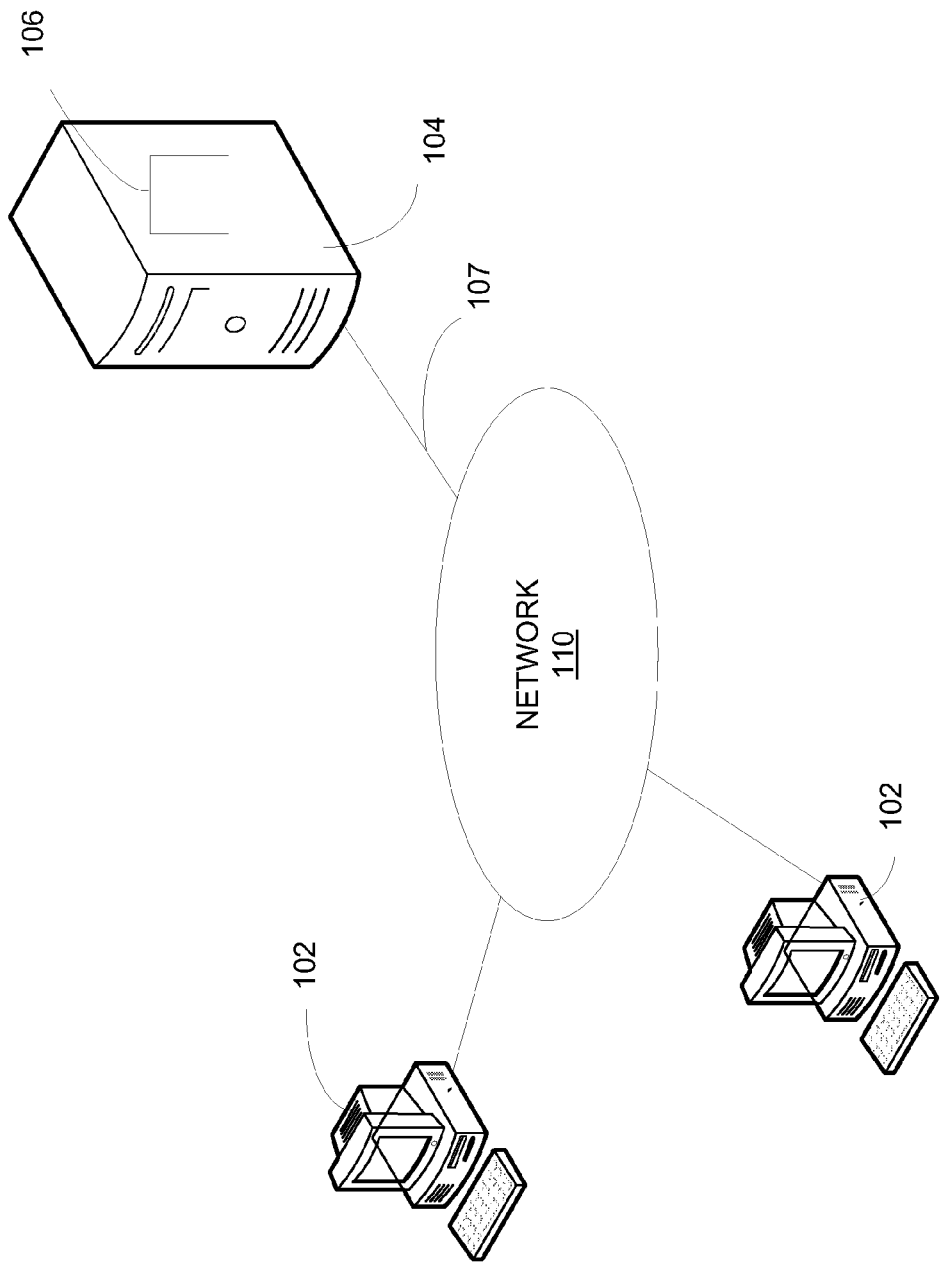
FIG. 1B illustrates a network system for determining a response time of a server, in accordance with another embodiment of the present invention.

Evaluation of the response time of a server in response to a client request may sometimes be required. Many sniffer and network monitor applications, such as, for example, HP Real User Monitor (RUM), refer to server response time in order to determine whether the server is overloaded or not functioning properly.

Server response time may be determined by measuring the time difference between the last request packet sent from a client and the start time of communication of the first response packet from the server (also known as "time-to-first-buffer"). However this approach is prone to inaccuracies. For example, a server may respond by sending a quick partial, pre-made or a predefined response, while continuing to process the request, so that calculating the response time according to the "time-to-first-buffer" approach would result in estimating server response time short of its true value. In another example, multiple virtualization may involve several machines using concurrently the same network (e.g. Ethernet) card, developing a narrow bottleneck and causing communication delays that would result in prolonging the "time-to-first buffer". This would consequently result in referring to a server response time which is longer that the true response time of the server.

Another way of calculating server response time, during a continues session in addition to the time to first buffer, the time difference between the end of transmission of the first data packet and the beginning of transmission of a further data packet may also be added. Time between two consecutive DATA packets may also contain a lot of acknowledgement packets (ACK packets) between them implying packet loss, retransmission and network problems which do not necessarily indicate a busy or slow server.

According to embodiments of the present invention, a method for determining a response time of a server may include monitoring communications to and from the server to detect a client request to the server. The method may also include detecting in the monitored communications at least one trigger signal associated with the client request. The method may also include calculating a response time which is calculated by measuring a period of time between an end time of a trigger signal and a beginning time of a first server response to the trigger signal and summing the measured periods of time.

"Trigger signal" may be defined, in the context of the present application, as a last signal received by the server prior to the server generating a response. Trigger signals may include a client data request, or a client acknowledgement. A server response includes an acknowledgment or data transmission by the server to the requesting client.

In some embodiments of the present invention the calculation of the response time of the server may include measuring a period of time between a time at which a latest trigger signal was fully received before a server response was transmitted and a beginning time of transmission of a final server response, and summing up all such measured periods between the receipt of a request and final transmission of a response to that request.

In some embodiments of the present invention the calculation of the response time may include considering the time period between an end time of receipt of a first data packet of the request by the server and a beginning time of last data packet transmission by the server, excluding time periods of acknowledgement transmissions to and from the server, and excluding time periods between an end of a data packet transmission from the server and an end time of receipt of a last acknowledgement packet in a time period between consecutive data packet transmissions from the server.

For example, in accordance with an embodiment of the invention, a response time of a server may be determined by adding to the "time-to-first-buffer" value any time difference between two consecutive packets in a communication between the server and the client (e.g. over TCP connections) of which at least one of the packets is a DATA packet (whether one or two of the packets are both requests, a request and a response or vice versa).

Thus, if the server responds by sending an initial "fast"/pre made/predetermined response to the client, a later response time difference associated with completing the task may be added to the calculated server response time. By "server response time" it is meant, in the context of the present invention, taking into account processing time and delay time associated with the server. If the server shares a network (e.g. Ethernet) card the sharing and/or bottleneck delays could be taken into account in the calculation of the "server response time", as time differences between two DATA packets could be added, while ignoring ACK packets and idle time. Time difference between DATA packets and ACK packets is ignored, thus the time spent on network errors, packet loss retrieval and retransmission is not taken into account.

FIG. 1A illustrates a network system for determining a response time of a server, in accordance with an embodiment of the present invention.

Server 104 may be communicating with clients 102, over communication network 110. Sniffer 106 may listen in to communications to and from server 104 over line communication link 107. For example, sniffer 106 may include a sniffer application such as, for example HP Real User Monitor (RUM). Sniffer 106 may identify client requests received by server 104 and responses transmitted by server 104. Sniffer 106 may identify communication packets and distinguish between data packets and acknowledgement packets. A computer program executed on sniffer 106 may then determine the response time of server 104 in accordance with embodiments of the present invention. Sniffer 106 may be a sniffer device. Sniffer 106 may be realized in the form of a hardware, software or a combination of hardware and software. Sniffer 106 may be separate from Server 104 as shown in FIG. 1B, illustrating a network system for determining a response time of a server, in accordance with another embodiment of the present invention.

FIG. 2 schematically illustrates communications between a server and a client, and demonstrates determination of the response time of the server, according to known methods and according to embodiments of the present invention.

By monitoring (e.g. using a sniffer application) to the communication between the client and server it may be detected that a client 102 (FIG. 1) had sent to server 104 (FIG. 1) a request in the form of Data packet 212. The server responds, first, by sending an acknowledgement—ACK packet 217—to the client. Later on three acknowledgement ACK packets (218, 219) are transmitted from the client to the server, which may be, for example, retransmission of an acknowledgement due to packet loss or due to a rigorous acknowledgement scheme observed by the client (or the network). Finally a Data packet 216 is transmitted from the server to the client.

A conventional approach to determining the response time of a server may consider the time difference between the end of transmission of the request (first Data packet 212) and the beginning of the following first Data packet transmission from the server (Data packet 214)—this is the so-called "time-to-first-buffer"). This time difference is indicated by time fragment 220, adjacent to Time line (marked "Time") representing the lapsed time. The time difference between the end of transmission of the first Data packet and the beginning of the next Data packet 216 (e.g. time fragment 220) may also be added (provided no transmission is received from the client, other than acknowledgments—e.g. the remaining ACK packets 218, 219).

According to embodiments of the present invention, the response time of the server may be determined by disregarding communication time, acknowledgments, and idle time and taking into account processing time only. This may be achieved by determining the response time of the server to be defined by a time period between an end time of receipt of a first data packet of the request by the server and a beginning time of a last data packet transmission by the server. This defined time period may exclude time periods of acknowledgement transmissions to and from the server, and exclude time periods between an end of a data packet transmission from the server and an end time of receipt of a last acknowledgement packet in a time period between consecutive data packet transmissions from the server. Thus the response time is the accumulated time of the time segment denoted 224.

An approach to response time determination according to embodiments of the present invention may take into account processing time of the server while distinguishing it from communication time (transmission or reception of communications), and idle time of the server, and also disregarding time spent on packet loss and retransmission that may not be taken into account when considering the response time of the server.

Determining the response time of a server in accordance with the present invention may contribute to better understanding of the work load on the server and may lead to better server load optimization.

Figure 3:
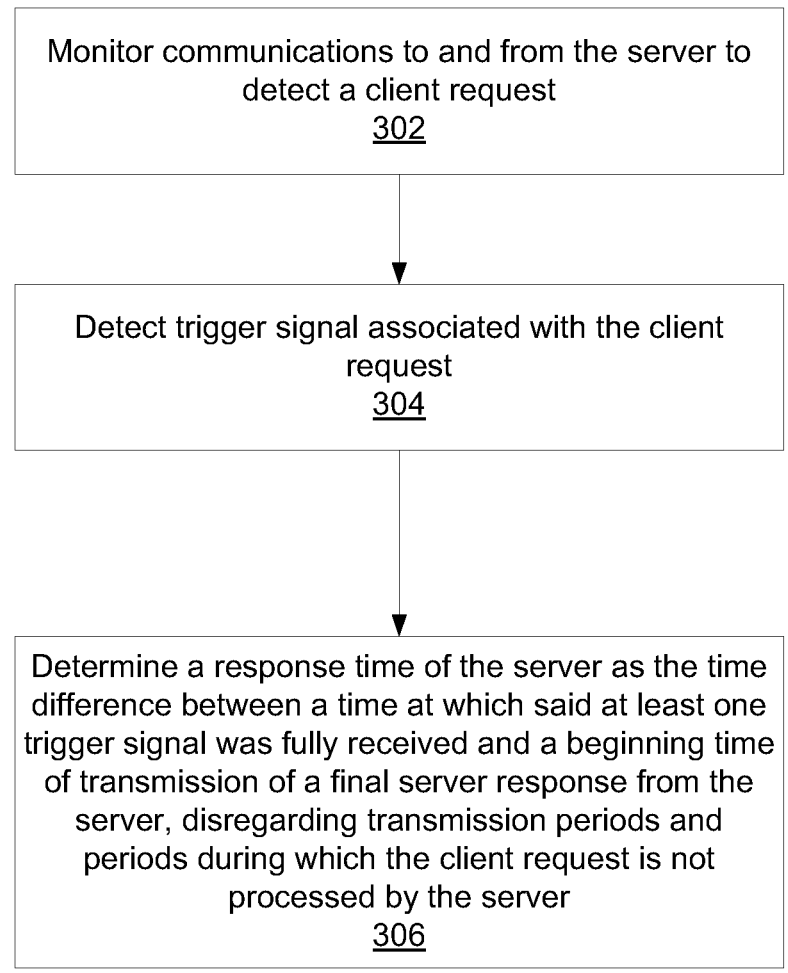
FIG. 3 is a chart illustrating a method for determining a response time of a server, in accordance with embodiments of the present invention.

FIG. 3 illustrates process 300 for determining a response time of a server, in accordance with embodiments of the present invention.

Process 300 for determining a response time of a server according to embodiments of the present invention may include monitoring 302 communications to and from the server to detect a client request to the server. Process 300 may also include detecting 304 in the monitored communications at least one trigger signal associated with the client request. The method may further include determining a response time of the server to be the time difference between a time at which said at least one trigger signal was fully received and a beginning time of transmission of a final server response from the server, disregarding transmission periods and periods during which the client request is not processed by the server.

Figure 4:
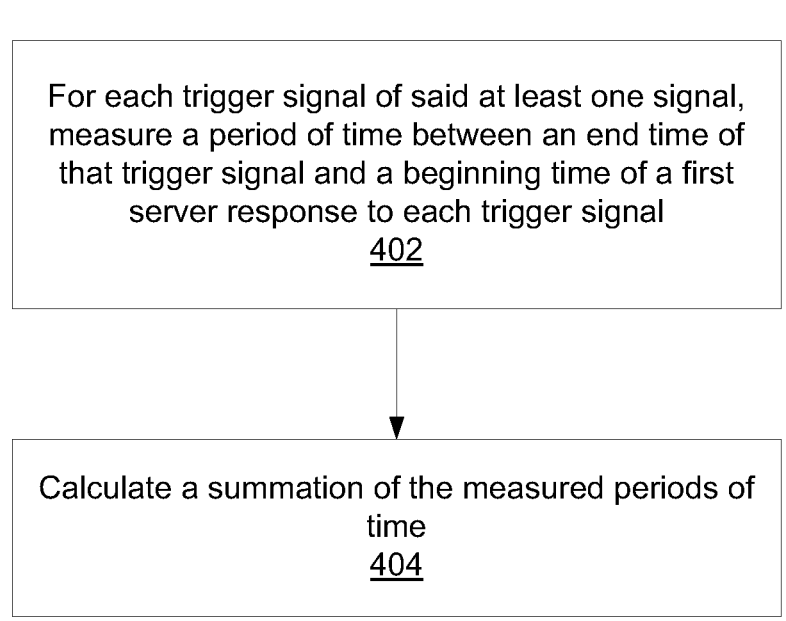
FIG. 4 illustrates an algorithm for calculating a response time according to embodiments of the present invention.

FIG. 4 illustrates Process 400 for calculating a response time according to embodiments of the present invention.

Process 400 may include measuring 402 a period of time between an end time of each trigger signal of said at least one trigger signal and a beginning time of a first server response to each trigger signal. Process 400 may further include summing 404 the measured periods of time, to obtain the measured response time of the server.

Figure 5:
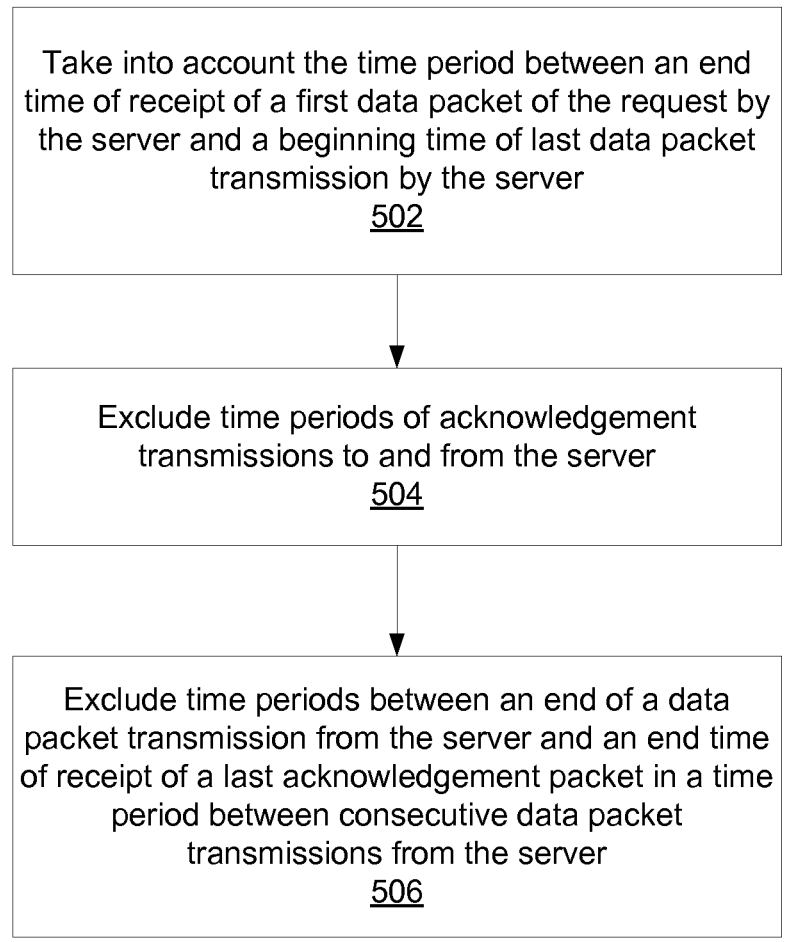
FIG. 5 illustrates another algorithm for calculating a response time according to embodiments of the present invention.

FIG. 5 illustrates Process 500 for calculating a response time according to embodiments of the present invention. Process 500 may include taking into account 502 the time period between an end time of receipt of a first data packet of the request by the server and a beginning time of last data packet transmission by the server which is related to the client request. Process 500 may also include excluding 504 time periods of acknowledgement transmissions to and from the server, and excluding 506 time periods between an end of a data packet transmission from the server and an end time of receipt of a last acknowledgement packet in a time period between consecutive data packet transmissions from the server.

Some advantages of determination of response time of a server, according to embodiments of the present invention include taking into account processing time of the server associated with additional data packets transmitted by the server after an initial response to a request from a client.

In addition, if the server shares a network, sharing and/or bottleneck delays will not be taken into account.

Furthermore, if a given communication link between a client and the server suffers from packet loss, or if a certain client fails to receive many of the transmitted packets due to buffering problems or if network in the path suffers from failures these times will not be taken into account and thus be distinguished from real processing time of the server.

Figure 6:
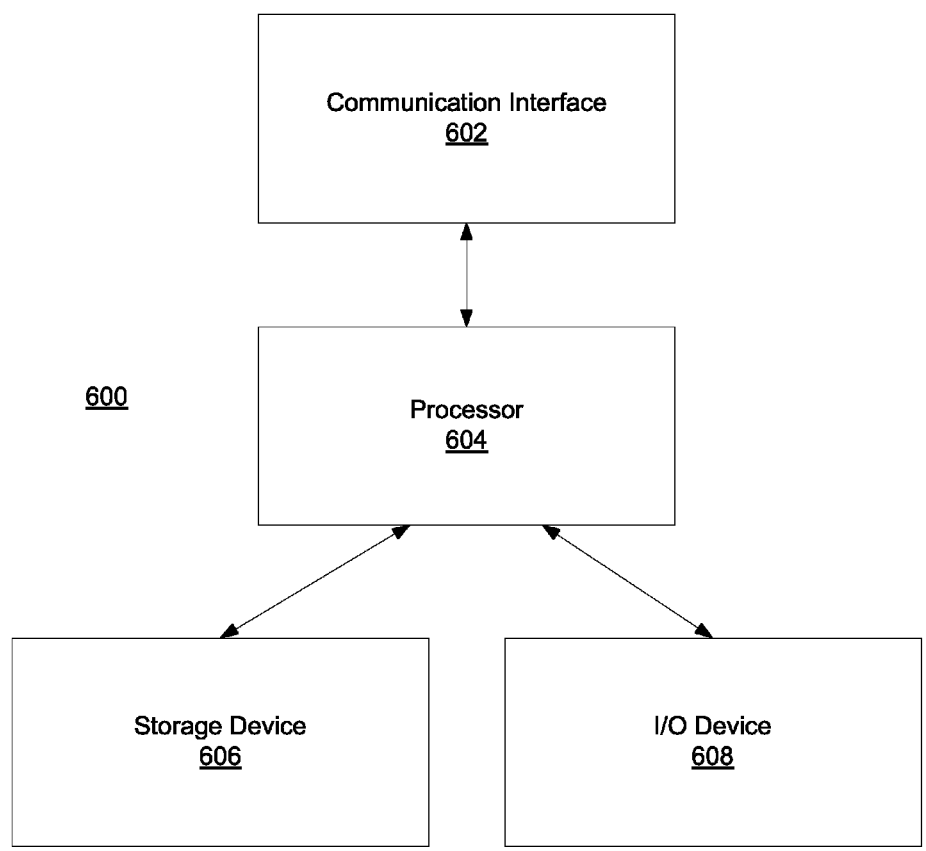
FIG. 6 illustrates a computer system for determining a response time of a server, in accordance with embodiments of the present invention.

FIG. 6 illustrates system 600 for determining a response time of a server, in accordance with embodiments of the present invention. System 600 may include storage device 606, such as, for example, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the above.

System 600 may also include a processor 604 to execute a computer executable program which includes instructions to determine a response time of a server, according to embodiments of the present invention. Such computer executable program may be stored on storage device 606.

The system may also include Input/Output (I/O) device 608 and communication interface 602, providing a communication link to a communication network or to a communication link, linking between a server and at least one client.

Aspects of the present invention may be embodied as a computer program product saved on one or more non-transitory computer-readable mediums in the form of computer-readable program code embodied thereon. For example, the computer-readable medium may be a computer-readable signal medium or a computer-readable non-transitory storage medium. A computer-readable storage medium may be, for example, an electronic, optical, magnetic, electromagnetic, infrared, or semiconductor system, apparatus, or device, or any combination thereof.

Computer program code of the above described embodiments of the invention may be written in any suitable programming language. The program code may execute on a single computer, or on a plurality of computers.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for determining a response time of a server, the method comprising, with a processor:
    monitoring communications to and from the server to detect a client request to the server;
    detecting in the monitored communications at least one trigger signal associated with the client request; and
    determining a response time of the server to be the time difference between a time at which said at least one trigger signal was fully received and a beginning time of transmission of a final server response from the server, disregarding transmission periods and periods during which the client request is not processed by the server.

2. The method of claim 1, wherein the determining step includes calculating a summation of processing periods of the server by adding to the summation, for each trigger signal of said at least one signal, a period of time between an end time of that trigger signal and a beginning time of a first server response to each trigger signal of said at least one signal.

3. The method of claim 1, wherein the determining step includes measuring a time period between an end time of receipt of a first data packet of the request by the server and a beginning time of last data packet transmission by the server which is related to the client request, excluding time periods of acknowledgement transmissions to and from the server, and excluding time periods between an end of a data packet transmission from the server and an end time of receipt of a last acknowledgement packet in a time period between consecutive data packet transmissions from the server.

4. The method of claim 1, wherein the monitoring step includes executing a sniffer application.

5. The method of claim 1, wherein the monitored communication includes communication over a network.

6. The method of claim 1, wherein the monitoring includes using a sniffer device.

7. The method of claim 6, comprising executing a sniffer application on the sniffer device.

8. A non-transitory computer readable medium having stored thereon instructions which when executed by a processor cause the processor to perform the method of:
    monitoring communications to and from the server to detect a client request to the server;
    detecting in the monitored communications at least one trigger signal associated with the client request; and
    determining a response time of the server to be the time difference between a time at which said at least one trigger signal was fully received and a beginning time of transmission of a final server response from the server, disregarding transmission periods and periods during which the client request is not processed by the server.

9. The non-transitory computer readable medium of claim 8, wherein the determining of the response time of the server includes calculating a summation of processing periods of the server by adding to the summation, for each trigger signal of said at least one signal, a period of time between an end time of that trigger signal and a beginning time of a first server response to each trigger signal of said at least one signal.

10. The non-transitory computer readable medium of claim 8, wherein the determining of the response time includes measuring a time period between an end time of receipt of a first data packet of the request by the server and a beginning time of last data packet transmission by the server which is related to the client request, excluding time periods of acknowledgement transmissions to and from the server, and excluding time periods between an end of a data packet transmission from the server and an end time of receipt of a last acknowledgement packet in a time period between consecutive data packet transmissions from the server.

11. The non-transitory computer readable medium of claim 8, wherein the monitoring of the communications includes executing a sniffer application.

12. The non-transitory computer readable medium of claim 8, wherein the monitored communication includes communication over a network.

13. The non-transitory computer readable medium of claim 8, wherein the monitoring includes using a sniffer device.

14. The non-transitory computer readable medium of claim 8, comprising executing a sniffer application on the sniffer device.

15. A system comprising a processor configured to:
monitor communications to and from the server to detect a client request to the server;
detect in the monitored communications at least one trigger signal associated with the client request; and
determine a response time of the server to be the time difference between a time at which said at least one trigger signal was fully received and a beginning time of transmission of a final server response from the server, disregarding transmission periods and periods during which the client request is not processed by the server.

16. The system of claim 15, wherein the processor is configured to calculatie a summation of processing periods of the server by adding to the summation, for each trigger signal of said at least one signal, a period of time between an end time of that trigger signal and a beginning time of a first server response to each trigger signal of said at least one signal.

17. The system of claim 15, wherein the processor is configured to measure a time period between an end time of receipt of a first data packet of the request by the server and a beginning time of last data packet transmission by the server which is related to the client request, excluding time periods of acknowledgement transmissions to and from the server, and excluding time periods between an end of a data packet transmission from the server and an end time of receipt of a last acknowledgement packet in a time period between consecutive data packet transmissions from the server.

18. The system of claim 15, wherein the processor is configured to execute a sniffer application.

19. The system of claim 15, configured to communicate over a network.

20. The system of claim 15, comprising a sniffer device.

* * * * *

UNITED STATES PATENT AND TRADEMARK OFFICE
CERTIFICATE OF CORRECTION

| | |
|---|---|
| PATENT NO. | : 8,886,795 B2 |
| APPLICATION NO. | : 13/015300 |
| DATED | : November 11, 2014 |
| INVENTOR(S) | : Rotem Steuer et al. |

Page 1 of 1

It is certified that error appears in the above-identified patent and that said Letters Patent is hereby corrected as shown below:

In the Claims

In column 7, line 21, in Claim 16, delete "calculatie" and insert -- calculate --, therefor.

Signed and Sealed this
Twenty-eighth Day of July, 2015

Michelle K. Lee
*Director of the United States Patent and Trademark Office*